Sept. 9, 1969 G. L. BROWN 3,466,650

MINIATURE TELEPHONE RINGER

Filed Dec. 12, 1966 3 Sheets-Sheet 1

INVENTOR.
GEORGE L. BROWN

BY

James T. Whitesel
AGENT

MINIATURE TELEPHONE RINGER

Filed Dec. 12, 1966 3 Sheets-Sheet 2

Sept. 9, 1969 G. L. BROWN 3,466,650

MINIATURE TELEPHONE RINGER

Filed Dec. 12, 1966 3 Sheets-Sheet 3

United States Patent Office 3,466,650

Patented Sept. 9, 1969

3,466,650

MINIATURE TELEPHONE RINGER

George L. Brown, Evanston, Ill., assignor to Automatic Electric Laboratories, Inc., a corporation of Delaware Filed Dec. 12, 1966, Ser. No. 601,006
Int. Cl. G10k *1/06*
U.S. Cl. 340—397 6 Claims

ABSTRACT OF THE DISCLOSURE

An electromagnetic telephone ringer unit having a single winding mounted on a laminated core, with a retainer clip inserted into each end of the winding alongside the core to lock a pole piece into position over each core end and to prevent lateral movement of the laminations. A straight spring is rigidly mounted at one end on a top plate, with the free end engaging a control flange extending from the midpoint of the polarized armature. A control plate is adjustably mounted on the top plate for engaging the spring to vary the tension exerted on the armature by the free end of the spring to mechanically tune the armature to respond to magnetic flux generated by the coil, when it is energized by a ringing signal of a particular frequency. A lever arrangement is included for moving pivotally mounted gongs either toward or away from a clapper to control the output volume of the ringer.

BACKGROUND OF THE INVENTION

Field

This invention relates generally to electro-magnetically operated signaling devices, and more particularly to polarized ringers of the miniature type adapted for use in telephone substation sets, and having frequency selection and loudness control.

Prior art

Since the advent of the combined type of telephone substation set, which is characterized by the mounting on the base thereof, of those components of the substation equipment housed previously in a separate container, or bell box, continuous efforts have been directed to the redesign of such components with a view towards space conservation and an ultimate reduction in the size and weight of the telephone substation set without increasing the cost or otherwise limiting the operating capability of these components.

Among the various designs and types of telephone substation sets currently known to applicant are those disclosed in design Patent Des. 180,081, issued Apr. 16, 1967, to Joseph A. Hill; design Patent Des. 186,668, issued Nov. 17, 1959, to Martin J. Stevko; and design Patent Des. 201,556, issued July 6, 1965, to Jerry J. Schoemann et al., each of which requires a ringer unit specifically designed for each individual type of substation set.

Since the telephone ringer assembly is one of the bulkiest and heaviest of the components now used in telephone substation sets, it is a primary object of the present invention to provide an improved miniature telephone ringer, which is compact in structure, light in weight and universally adapted for inclusion in all substation sets, such as those similar to the above-identified types, in minimum of space and at a minimum of cost.

Today's modern operating telephone companies find it necessary to equip their exchange offices with specific apparatus, whereby the many service requirements of their customers are satisfactorily provided. Accordingly, in the provision of certain of these services, different types of ringing devices have been employed for each of the conventional signaling systems. The more conventional signaling systems in current use are the so-called straight line and the harmonic systems. In the past, since the above-named signaling systems operated in response to different electrical characteristics, it was necessary to provide at least two separate and distinct types of ringing devices for use with these systems and to further provide a ringing device individually designed for each specific type of substation set. The manufacture of these different types of ringers in accordance with the individual design for the specific type of substation set, is therefore quite costly, and as such, a further object of this invention is to provide a novel ringer structure which is common to the above mentioned ringing systems and is sufficiently universal in design and construction to permit its incorporation in all of the above-mentioned types of telephone substation sets.

Summary of the invention

In the achievement of the above-mentioned objects, there is provided in a preferred embodiment of the invention, a universal telephone substation set ringer motor unit including a single coil having a laminated core, the laminations of which are held in place by a pair of retainer clips that both position the core against lateral and longitudinal movement and lock a pole piece to the core at each end thereof. A top mounting plate, having an armature pivotally mounted thereto and polarized by a ceramic magnet, is attached to mounting ears on the pole pieces by means of screws, with the armature being positioned in a plane substantially parallel to the core. A straight control spring is rigidly attached at one end by a screw to a centrally positioned mounting ear on the top mounting plate, with the other end of the spring engaging a notch in a control flange on the armature. An adjuster plate having an ear forming a portion thereof and engaging the control spring is arranged to be adjustably secured to the top mounting plate in order to selectively change the length and thereby the tension of the free end of the control spring that engages the notch in the control flange on the armature. The clapper rod is provided with an eye in one end and is specifically shaped to follow the contour of a special washer having a notch provided therein, with this assembly positioned over the polarizing magnet and a screw inserted through the eye of the rod, washer, magnet and into a threaded hole in the armature, whereby the magnet and clapper rod are secured to the armature. A mounting flange is provided on each of the lower edges of the pole pieces, whereby the assembled ringer motor unit may be mounted on either the common two-gong, single gong, or any other type of telephone base. On the two-gong ringer, each of the pair of gongs is mounted off-center on a plate that is pivotally mounted off-center to the base. A volume control arm operates a sliding lever, which engages guides provided in the plates, to rotate each plate and associated gong either toward or away from the clapper weight, thus controlling the loudness, or output volume, of the ringer. With the single gong ringer base, the loudness may be adjusted by loosening the plate mounting screw and turning the plate and gong either toward or away from the clapper weight.

DESCRIPTION OF THE DRAWINGS

The nature of the invention and its distinguishing features and advantages, which reside in the construction and arrangement and combination of parts, will be more clearly understood from the following detailed description, taken in conjunction with the accompanying drawings, wherein.

DETAILED DESCRIPTION

Structure

Figure 1:
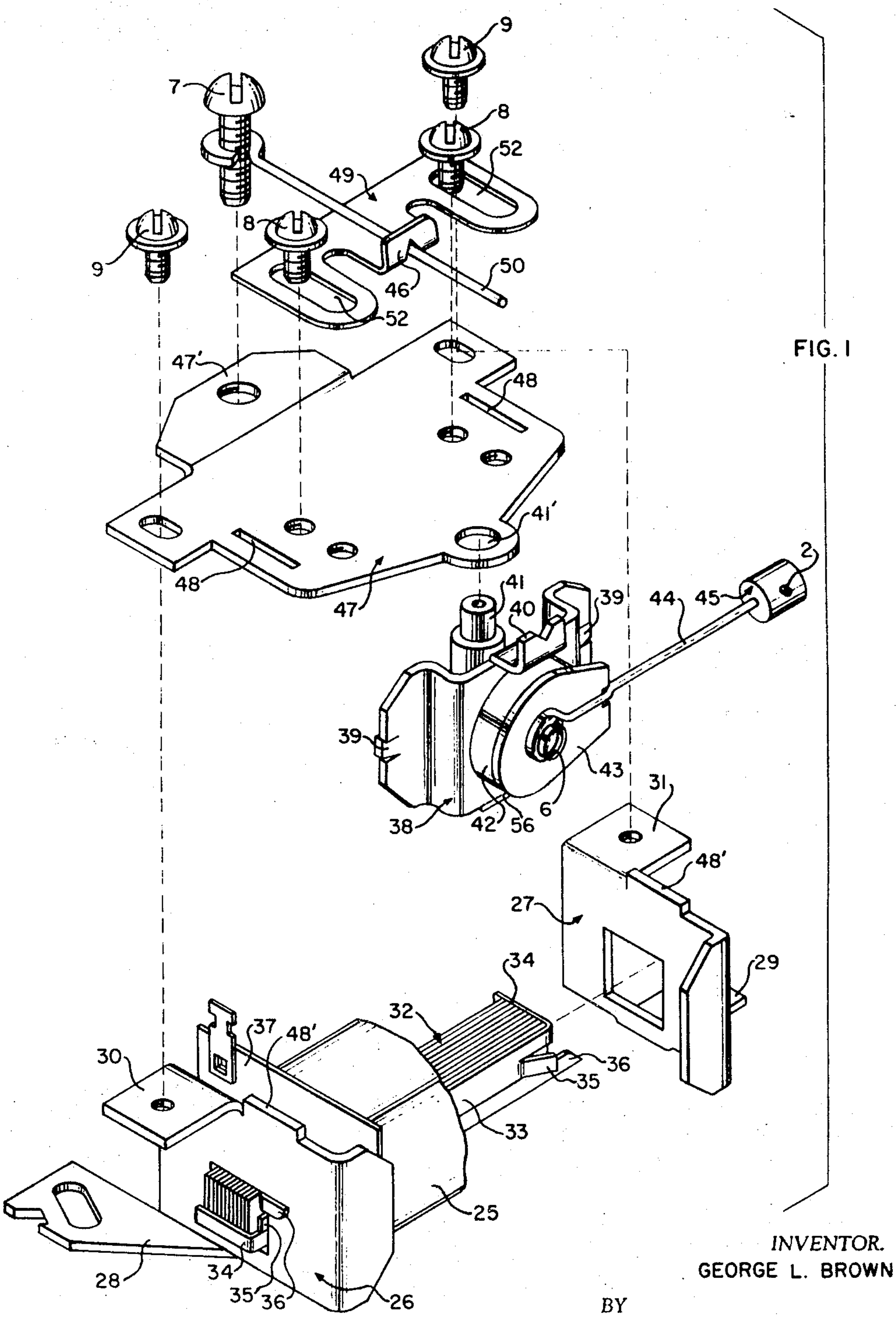
FIG. 1 is an exploded perspective view of the ringer motor unit.

Referring to the drawings, and in particular to FIG. 1, the ringer motor unit consists of a preformed coil 25 having a square, or rectangular, center opening for accommodating the laminated core 32 therein. A combined insulator and terminal card 37 is secured to each end of coil 25, with an end of the coil winding attached to a corresponding adjacent terminal. The laminated core 32 is inserted through the center opening of coil 25 and pole pieces 26 and 27 are respectively positioned at each end of coil 25, adjacent to the respective terminal cards 37, with each end of core 32 projecting through a rectangular opening in the corresponding pole piece. A retainer clip 33 is inserted into each pole piece opening and is pushed inward lengthwise along side of core 32 until the retainer arms 34 thereon engage the respective ends of the core. Simultaneous with the above, the retainer springs 35 on clip 33 engage the edges of the openings in the pole pieces to exert pressure against core 32, and locking fingers 36 are bent outward to engage the side ends of the pole pieces, whereby all movement of the core within the coil is prevented and the pole pieces are locked to each end of the core. Armature 38 is formed in the shape of a flat U, wherein the upper ends of each leg of the U are bent outward at right angles to the leg, with each of these outwardly bent ends having a pole piece engaging point 39 stamped therein. A flange 56 (not shown in detail) extends inwardly from the bottom center of armature 38 to provide a pivotal mounting for the lower end of armature pivot pin 41, with the upper end of pin 41 protruding through hole 41' provided in top plate 47, and the upper end of pin 41 suitably secured to plate 47, as by riveting. Clapper rod 44 is provided with a clapper weight 45 at one end and with an eye at the other and is specifically shaped to follow the contour of a special washer 43 having a notch therein. This assembly is positioned over the washer-shaped polarizing magnet 42, and screw 6 inserted through the eye of rod 44, washer 43, magnet 42, and into a threaded hole (not shown) in the armature 38, whereby magnet 42 and the clapper rod assembly are secured to the armature. This subassembly, consisting of the top plate 47 having armature 38 pivotally mounted thereto and including polarizing magnet 42 and associated clapper rod 44 and weight 45, is positioned over coil 25 and pole pieces 26 and 27, with fingers 48' of the two pole pieces engaging the positioning slots 48 in the top plate 47. Top plate 47 is thereafter secured to pole pieces 26 and 27 by means of screws 9, which engage threaded holes provided in mounting ears 30 and 31 of pole pieces 26 and 27, respectively. Control spring adjuster plate 49 consists of a flat B-shaped plate with oblong shaped mounting and adjusting holes 52 provided in the plate towards each end, and a centrally located adjusting ear 46 bent upward at right angles thereto and including an inverted V-shaped opening in ear 46 at the point of bend, with respect to the surface of adjuster plate 49. Adjuster plate 49 is placed on top of plate 47 and held in place by means of screws 8 engaging corresponding threaded holes in plate 47. Control spring 50 is formed with an eye in one end, with the other end being inserted through the inverted V opening in adjusting ear 46 and engaging a notch provided in armature control flange 40. Spring 50 is secured in the above-described position by means of screw 7 being inserted through the eye in the one end and into a threaded hole provided in mounting ear 47' of plate 47.

Figure 3:
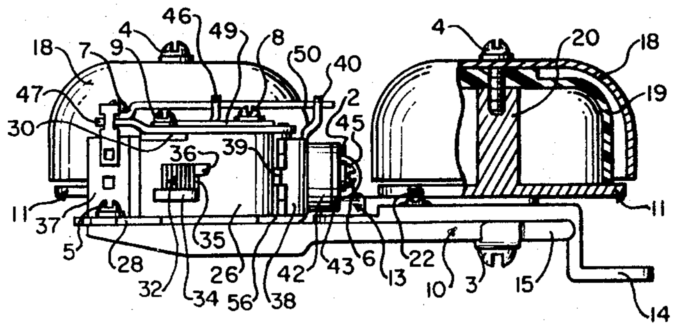
FIG. 3 is a side plan view of the assembled ringer shown in FIG. 2 including a partial cross-section of the right-hand gong and mounting.
Figures 4, 5:
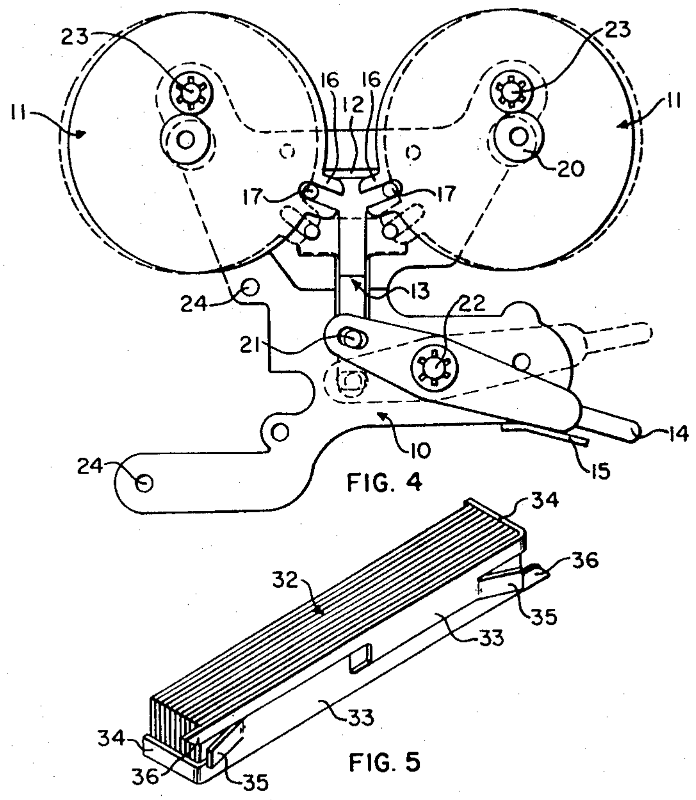
FIG. 4 is a front view of the two-gong ringer base without the gongs and ringer motor unit mounted thereon.
FIG. 5 is a side view of the laminated core and the retainer clips.

The two-gong ringer base, shown in FIG. 4, consists essentially of a base 10 having a pair of gong mounting plates 11 pivotally mounted off-center at pivot pins 23, which are rigidly affixed to base 10. A mounting post 20 is centrally secured to each mounting plate 11 by any suitable means, such as staking, and is internally threaded at the upper end, whereby the gongs 18 and resonators 19 are mounted off-center thereto by screws 4 extending through off-center mounting holes in the gongs and resonators and the threading as shown in FIG. 3. A T-shaped channel 12 is provided in base 10 to accommodate volume control level 13, which is positioned for slidable operation within the channel. Volume control arm 14 is pivotally mounted at post 22 and contains an oval shaped hole in the left-hand end for engaging pin 21, which is affixed to the lower end of control lever 13, whereby raising or lowering of the right-hand end of control arm 14 will cause lever 13 to slide down and up, respectively. A pair of guide pins 17 are attached to the upper T-end portions of control lever 13, with each guide pin 17 engaged between a pair of guide fingers 16 located on the outer rim of each of the mounting plates 11. Thus, as arm 14 is moved, lever 13 will also move and thereby rotate the plates 11 and associated gongs 18 at pivot points 23 either toward or away from each other, depending on the direction in which control lever 13 is moved. In this manner, gongs 18 are either moved toward the clapper weight 45 or away from it (as shown in FIG. 2) to regulate the output volume of the ringer.

Figure 2:
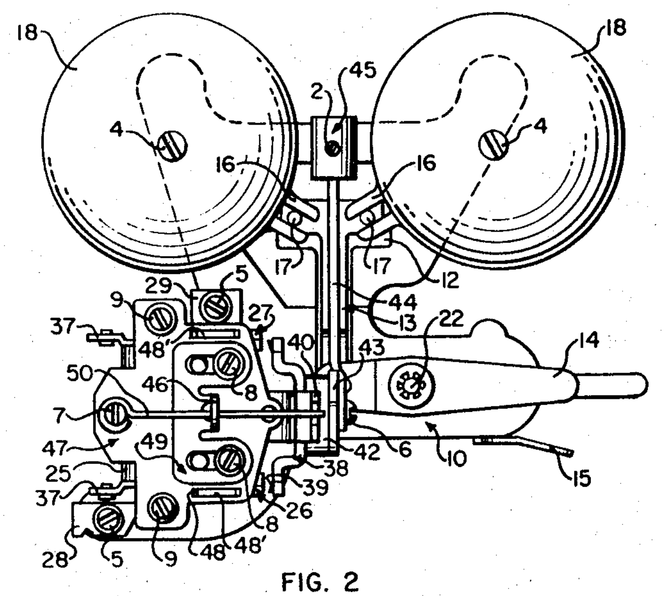
FIG. 2 is a front view of the ringer motor unit as mounted on a two-gong ringer base.

As shown in FIG. 2, the ringer motor unit is mounted on base 10 by means of screws 5 being inserted through holes in mounting flanges 28 and 29 of pole pieces 26 and 27, respectively, and into threaded holes 24 of frame 10 (FIG. 4), with clapper weight 45 positioned between gongs 18.

Figure 6:
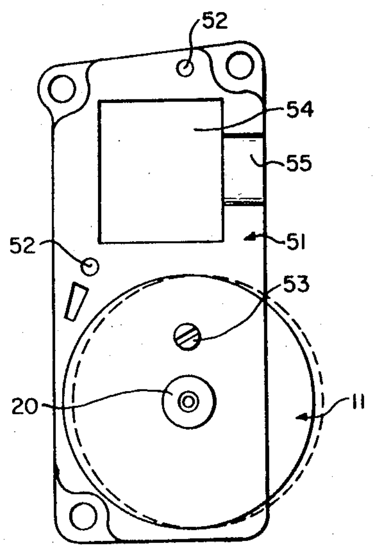
FIG. 6 is a front view of the single gong ringer base without the gong and ringer motor unit mounted thereon.

FIG. 6 shows single gong ringer base 51 with threaded mounting holes 52 provided therein, and having a rectangular opening 54 for accommodating the portion of coil 25 that extends below the level of the base. An indentation 55 is cut into base 51 in order to accommodate armature bearing flange 56 and the lower end of armature pivot pin 41. It will be noted that gong mounting plate 11 is pivotally mounted to base 51 at screw 53, with a dotted circle representing the location of single gong 18 when it is mounted on the base. Before the ringer motor unit is mounted on base 51, washer 43 and clapper rod 44 are rotated to a position 180° from that shown in FIG. 1. The ringer motor unit is mounted on base 51 by means of screws 5 being inserted through holes in mounting flanges 28 and 29 of pole pieces 26 and 27, respectively, and into the threaded holes 52 of base 51, with clapper weight 45 positioned to the right of and nearly adjacent to gong 18, which is represented by the dotted circle.

Operation and adjustment

It will be assumed that a complete telephone ringer including the disclosed ringer motor unit is to be used in a signaling system employing harmonic ringing. The procedure by which the ringer motor unit is tuned, in order for it to properly operate in response to receipt of a ringing signal of a specific frequency, will hereafter be described. It will be appreciated that in a frequency selective telephone ringer including the disclosed ringer motor unit, the first step in tuning the unit requires that the armature 38 be biased to assume a center, or neutral, position with respect to the distances from the armature contact points 39 and the side portions, or engaging surfaces, of pole pieces 26 and 27, respectively. The armature is biased by loosening adjuster plate screw 8 and sliding control spring adjuster plate 49 in the necessary direction to vary the tension of the free end of the control spring 50, which is engaged in the notch of the armature control flange 40, until armature 38 is in the above-mentioned center, or neutral, position. Coarse tuning of the ringer motor unit is accomplished by changing the mass of the clapper weight 45, and fine tuning by changing the position of weight 45 along the length of clapper rod 44. It will be noted that the full range of signaling frequencies, which extend from 16 to 66 c.p.s., is divided into a plurality of groups and that a predetermined different mass clapper weight 45 and diameter of control spring 50 is provided for each group. When a particular ring frequency signal is thereafter applied to the coil 25 of the ringer motor unit, a further refinement of the fine tuning adjustment and of the biasing of the armature may be made to thus improve the mechanical resonance of the ringer. The ringer is thus adjusted and ready for operation responsive to the application to coil 25 of a ringing signal of a particular frequency.

The loudness of the two-gonig ringer is initially adjusted by moving volume control arm 14 (FIG. 2) to its furthest upward position, then loosening mounting screws 4 and rotating gongs 18 to adjust the ringer for maximum loudness. Thereatfer, the loudness of the ringer may be controlled in accordance with the desire of the individual subscriber by moving control arm 14 downward to rotate the gongs 18 inward toward clapper weight 45, whereby the distance between the gongs is reduced to decrease the output volume of the ringer.

The loudness of the single gong ringer (FIG. 6) may be varied by loosening mounting screw 53 and rotating the off-center mounted plate 11 and associated gong 18 either away from or toward the clapper weight 45. The adjustment may be refined by loosening mounting screw such as 4 and rotating only gong 18.

Although not shown, the above arrangement of loudness control for the two-gong ringer may be modified whereby one of the gongs 18 is permanently fixed on the mounting plate 11, which may be either permanently fixed or not, equipped with the mounting plate guide 16. In this manner, volume control arm 14 will only move the other gong, which is linked thereto by means of guide 16 and guide pin 17, either toward or away from clapper weight 45 for regulating the output volume of the ringer.

Having described my invention, what is considered new and is desired to have protected by Letters Patent will be pointed out in the appended claims.

What is claimed is:

1. In an electromagnetic telephone ringer motor unit including a single core having a coil winding mounted thereon; a pole piece mounted over each end of said core; an armature engaging surface individual to each said pole piece, extending from corresponding sides thereof and bent inwardly toward the other pole piece in a plane parallel to said core; a top plate; means for mounting said top plate over said core, said coil winding and said pole pieces; an armature pivotally mounted to the under side of said top plate with the ends of said armature positioned adjacent to the corresponding said armature engaging surface; a permanent magnet mounted on said armature for polarizing said armature; a control flange extending upward from the center of said armature; a control spring for biasing said polarized armature toward its neutral position, wherein the distances between said armature ends and the respective said armature engaging surfaces of said pole pieces are substantially equal; said spring having one end rigidly attached to the upper surface of said top plate and the other end engaging said control flange and adjustable means for varying the tension exerted by said other end of said control spring on said polarized armature, when deflected from said neutral position, to alter the mechanical resonance of said ringer unit, whereby said ringer is mechanically tuned to ɪespond to an excitation current of a specific frequency flowing through said winding.

2. Apparatus in accordance with claim 1, wherein said core consists of a plurality of laminations; a pair of core retainer clips, each being of a length slightly greater than the length of said core; each of said clips inserted at the respective end of said core and along the same side thereof between said core and said coil winding into an edge-to-edge engaging position with respect to the other clip and parallel to the longitudinal plane of said laminations, after said mounting of said pole pieces over said core ends; means comprising a spring portion formed on one end of each of said retainer clips engaging the adjacent said pole piece for biasing said core against lateral movement within said pole pieces and said coil winding; means comprising an arm portion formed on said one end of each of said retainer clips engaging the adjacent ends of said laminations for holding said core against longitudinal movement within said pole pieces and said coil winding; and means comprising a locking finger forming the other end of each of said retainer clips positively engaging the adjacent said pole piece for rigidly locking each said pole piece in said mounted position over the corresponding ends of said core.

3. Apparatus in accordance with claim 1, including a clapper rod secured at one end to the midpoint of the outside surface of said armature; a clapper weight attached to the other end of said rod; a mounting base; a pair of gong mounting plates pivotally mounted on said base; a ringer gong mounted on each said plate; means for mounting said motor unit on said base with said clapper weight positioned between said gongs; said polarized armature responding to the alternating magnetic flux, generated by said excitation current flowing through said winding, for vibrating said clapper rod to alternately strike said ringer gongs with said weight and audibly sound a signal; slide means engaging each of said mounting plates; and means for moving said slide means to simultaneously pivot both said gong mounting plates and the respective said gongs to vary the distances from said clapper weight to said gongs for controlling the loudness of said audible signal.

4. Apparatus in accordance with claim 1, wherein said adjustable means includes a control plate; an ear on said control plate; and means on said control plate including mounting screws for mounting said control plate on said upper surface of said top plate in a plurality of selected position; said control plate ear engaging said control spring at a plurality of positions corresponding to said selected mounting positions to thereby vary said tension exerted by said other end of said control spring on said armature control flange in accordance with each said selected mounting position of said control plate.

5. In an electromagnetic telephone ringer motor unit including a coil winding having a laminated core of substantially square cross-section; a pole piece mounted over each end of said core; means for securely positioning said laminated core within said coil winding and including means for locking each said pole piece on the said respective core end; an armature engaging surface individual to each said pole piece, extending from corresponding sides of said pole pieces and bent inwardly toward one another in a plane parallel to said core; a mounting ear individual to each said pole piece, extending from corresponding top edges of said pole pieces and bent outwardly away from one another in a plane parallel to said core; a top plate secured to said mounting ears in a position directly over said coil winding and said pole pieces; an armature; means for polarizing said armature; means for pivotally mounting said armature to the underside of said top plate with the ends of said armature positioned outside of, but adjacent to, the corresponding said armature engaging surfaces of said pole pieces; a control flange extending upward from the center of said armature; a control spring having a fixed end rigidly attached to the upper surface of said top plate and a movable end engaging said control flange; and means for varying the tension exerted by said movable end of said control spring on said armature control flange to bias said armature to a neutral position by establishing equal distances between said armature engaging surfaces of said pole pieces and said armature ends; whereby said polarized armature is tuned to respond to an alternating magnetic flux path generated by said coil, when excited by a signal of a specific frequency.

6. An electromagnetic telephone ringer having a core structure with a pair of pole pieces; winding means on said core structure; a mounting plate; a polarized armature having two ends cooperating with said pole pieces, respectively; means for pivotally mounting said armature in said plate; a control spring for biasing said armature toward its neutral position, wherein the distances between the two armature ends and the two pole pieces are substantially equal; said spring having a first end rigidly secured to said mounting plate and a second end engaging said armature; and adjustable means for varying the free length of said control spring between said two ends thereof and thus varying the tension exerted by said second end on said armature, when deflected from neutral position, to alter the mechanical resonance of said ringer, whereby said ringer is mechanically tuned to respond to an excitation current of a predetermined frequency flowing through said winding means.

References Cited

UNITED STATES PATENTS

| | | | |
|---|---|---|---|
| 2,082,095 | 6/1937 | Bredehoft | 340—397 |
| 2,236,316 | 3/1941 | Helgason | 336—210 |
| 2,607,833 | 8/1952 | Schomaker | 340—397 |

JOHN W. CALDWELL, Primary Examiner

CHARLES M. MARMELSTEIN, Assistant Examiner